United States Patent [19]

Alexander

[11] 4,238,001

[45] Dec. 9, 1980

[54] KNOCKDOWN SAWHORSE BRACKET CONSTRUCTION

[76] Inventor: Donald W. Alexander, 1104 Dillon, Napa, Calif. 94558

[21] Appl. No.: 65,367

[22] Filed: Aug. 9, 1979

[51] Int. Cl.³ .............................................. F16M 11/00

[52] U.S. Cl. .................................... 182/153; 182/181; 182/225; 16/171

[58] Field of Search ............... 182/153, 186, 226, 225, 182/181–185, 224; 16/171, 176; 403/4, 172, 176, 217, 219

[56] References Cited

U.S. PATENT DOCUMENTS

| | | | |
|---|---|---|---|
| 646,620 | 4/1900 | Cronkhite | 182/153 |
| 1,153,470 | 9/1915 | Wagner | 182/226 |
| 1,174,964 | 3/1916 | Bradley | 182/186 |
| 1,881,755 | 10/1932 | Logan | 182/153 |
| 2,136,420 | 11/1938 | Edwards | 182/226 |
| 2,427,679 | 9/1947 | Larson | 182/153 |
| 2,594,464 | 3/1952 | Loucks | 182/225 |
| 3,530,956 | 9/1970 | Jadek | 182/226 |
| 4,189,247 | 2/1980 | Burwall | 182/186 |

*Primary Examiner*—Reinaldo P. Machado
*Attorney, Agent, or Firm*—Thomas Schneck

[57] ABSTRACT

A sawhorse bracket having three commonly hinged members including a central member for connection to a horizontal beam and two leg members for connection to downwardly extending legs. A hinge pin placed through interleaved hinge posts of the three members allows rapid assembly and disassembly.

11 Claims, 6 Drawing Figures

KNOCKDOWN SAWHORSE BRACKET CONSTRUCTION

BACKGROUND OF THE INVENTION a. Field of the Invention

The invention relates to brackets and more particularly to a knockdown construction for sawhorse brackets.

b. Prior Art

In the construction trade, sawhorses are almost universally used to provide work surfaces at convenient heights for operations such as sawing, sanding, painting and nailing. One of the advantages of sawhorses is that they can be easily moved and stacked. Typically, they are light weight and may be easily carried.

Sawhorse brackets have been invented to aid in the construction of wooden sawhorses and in most instances the brackets are left in place and the sawhorses are usually not disassembled. Some craftsmen have only an occasional need for sawhorses, or use modes of transportation in which fully extended sawhorses may not be carried. Previously, collapsable sawhorses have been invented which use brackets for holding sawhorse forming beams together in which the sawhorse legs pivot and/or telescope inwardly to provide a compact structure.

In U.S. Pat. No. 592,574 F. Ring teaches a trestle construction in which opposite brackets are attached to a horizontal beam and each bracket supports a downwardly extending beam by means of a hinge. In U.S. Pat. No. 1,685,283 J. P. Gibson teaches a trestle bracket construction in which a central plate spans the top of a horizontal beam and has two dependently hinged leg members connected thereto by means of hinges at opposite sides of the plate. The leg members have inward ledges to support the horizontal beam. In U.S. Pat. No. 2,812,219 G. Lange discusses a bracket construction in which two bracket members have a slidable interlocking fit with respect to each other.

Few prior art sawhorse brackets lend themselves to be readily carried in a tool box, as well as permitting rapid assembly and disassembly of sawhorse beams. Those which do, usually have a relatively weak hinged construction which makes heavy duty work difficult.

An object of the present invention is to provide a sawhorse bracket which may be conveniently carried in a tool box, yet which has sufficient strength for heavy duty use and which permits rapid assembly and disassembly of sawhorse beams.

SUMMARY OF THE INVENTION

The above object has been achieved in a sawhorse bracket having a knockdown construction. Three bracket members, hinged together using interleaving hinge posts, similar to the type found on doors, are used to form the bracket. A central bracket member attachable to an end of a transverse beam has downwardly extending, aligned, spaced apart hinge posts. These hinge posts may be aligned with upwardly extending, aligned hinge posts of a pair of leg members, each of which may be attached to a downwardly extending beam. The hinge posts of the two leg members are offset so that the hinge posts may be interleaved and aligned with each other and with the hinge posts of the central bracket member. A removable hinge pin is passed through all of the hinge posts so that the leg members may be rapidly removably joined to the central bracket member.

Each of the members forming the bracket has sidewalls which are adapted to receive and support a beam, such as by forming a pocket for holding the beam. The beams may be secured in place by means of fasteners, such as nails, which are connected to the beams through the sidewalls.

The maximum extent of separation of the leg members is controlled by the relative angle between the truncated upper end of the leg members and the bottom of the sidewalls of the central bracket member. When separated, the leg members are prevented from unintentional inward pivoting or collapse by means of a latch connected to each leg member and a catch defined within the lower portion of the central bracket member. The latch may be released and the hinge pin pulled to allow the bracket to be readily disassembled. Fasteners may be removed from respective members and the members conveniently stored in a compact space such as a tool box.

DESCRIPTION OF THE PREFERRED EMBODIMENT

Figure 1:
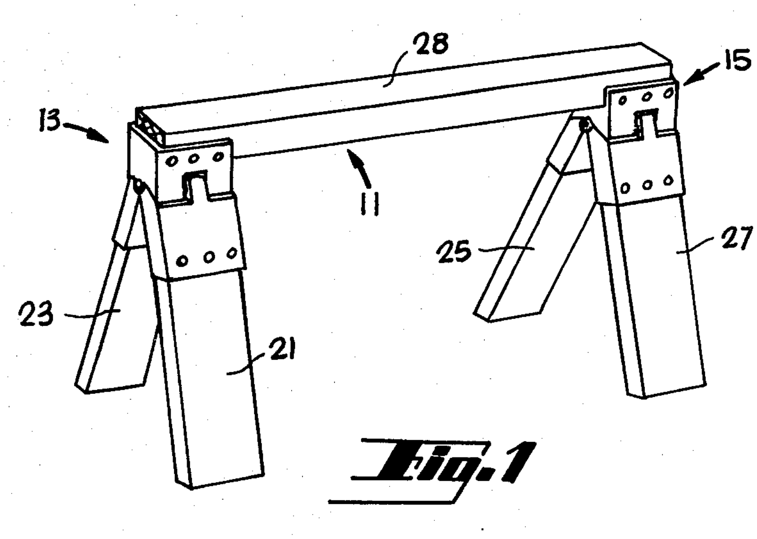
FIG. 1 is a perspective view of a fully assembled sawhorse utilizing the brackets of the present invention.

With reference to FIG. 1, a sawhorse 11 is shown having the left hand bracket 13 and the right hand bracket 15, both providing support for junctions of beams. Ordinarily, only two sawhorse brackets are used to form a sawhorse, but for long spans, intermediate sawhorse bracket supports can be provided. The present invention contemplates brackets on opposite ends of the horizontal beam of a sawhorse, but a bracket of the present invention, modified slightly, could be used at intermediate support points as a trestle. The beams which are used to form the sawhorse are typically wooden beams, such as two-by-fours, cut to convenient lengths. Typically, each of the legs 21, 23, 25, 27 is approximately three feet long while the horizontally transverse beam 28 is usually longer, approximately four or five feet long. The legs are of equal length, with an angle between opposed legs, such as legs 21, 23 not exceeding 45 degrees. The bracket of the present invention is not restricted to use with wooden beams; other beam materials could be used.

Figure 2:
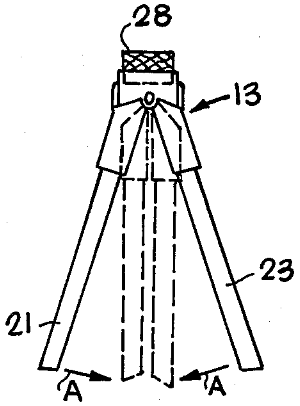
FIG. 2 is an end view of the sawhorse of FIG. 1 showing hinge action by inward movement of the sawhorse legs from a position of maximum separation to a position of minimum separation.

FIG. 2 shows how the hinge construction of the present invention allows the legs 21, 23 to pivot inwardly as indicated by the arrows A. This allows sawhorses constructed with the brackets of the present invention to be laid flat for ease of storage or transportation.

Figure 3:
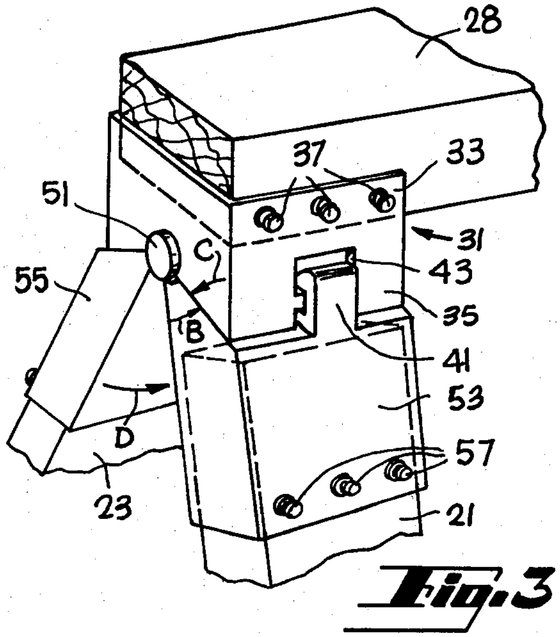
FIG. 3 is a perspective view of the sawhorse bracket construction of the present invention.

The construction of the brackets of the present invention may be seen more clearly with reference to the detailed view of FIG. 3. In FIG. 3 a central bracket member 31 has an upper sidewall portion 33 which is adapted to receive and support at least the lower half of an end of the horizontally extending beam 28 by providing a three-sided nest around the beam. A lower portion 35 of the central bracket member has sidewalls connected to the sidewalls of the upper portion 13 and may be separated therefrom by an internal base plate, not shown in FIG. 3, which provides a floor for beam 28. Such a base plate is not necessary, but merely preferable. Beam 28 is held in place by fasteners 37 which pass through holes defined within the upper portion of the central member. The number or position of holes is not critical.

The lower bracket portion 35 has a recess 43 for allowing a latch 41 to pass therethrough to engage a catch in the recess. The lower bracket portion has hinge posts through which the hinge pin 51 passes. A pair of opposed leg members 53, 55 each have upwardly extending hinge posts which are offset from each other. Hinge posts from opposed leg members are aligned in an interleaving relationship so that the hinge pin 51 can pass therethrough, together with the hinge posts of the central bracket member 31. The downwardly extending leg members 53, 55 each have sidewalls which receive the downwardly extending beams 21, 23. Holes are defined in each leg member allowing the fasteners 57 to pass through for holding a beam within the sidewalls, such as beam 21 in the downwardly extending leg 53.

The angle defined between the downwardly extending legs 53, 55 depends upon the angle formed by the upper periphery of the sidewalls, in particular the relation between the angle which the leg members make with the central bracket member. This is generally defined by the angle of truncation of the upper portion of the sidewalls of the leg members. This angle is indicated by the arrow B. Angle B has no definite value because the size of the angle depends on the angle of truncation of the lower periphery of the sidewalls of lower portion 35 of central bracket member 31. This angle of truncation of the lower portion of central bracket member 31 may be indicated by the angle C. As the angle C becomes greater, the angle B also becomes greater. Conversely, as the angle C becomes smaller, so does the angle B. The angles B and C are selected to be the same for both leg members and are selected so that a comfortable working angle, D, between opposed legs at maximum separation is preferably less than 45° and somewhere near 30°, although this value is not critical. Usually an imaginary vertical line will bisect angle D when the sawhorse legs are open.

The leg members 53, 55 preferably have four sided sidewalls forming a pocket for receiving beam 21. Four sidewalls are not necessary and three may be used, but greater support is achieved by using four. On the other hand, greater variation in beam thickness may be had with only three sidewalls. In the event that only three sidewalls are used, additional holes on opposite lateral sidewalls must be provided in order to firmly secure a beam to the downwardly extending leg member. Similarly, the upper bracket member, while showing only three sidewalls covering only the lower half of beam 27, may in an alternate construction have sidewalls which completely enclose the end of a beam forming a pocket in which the beam is nested.

Figure 4:
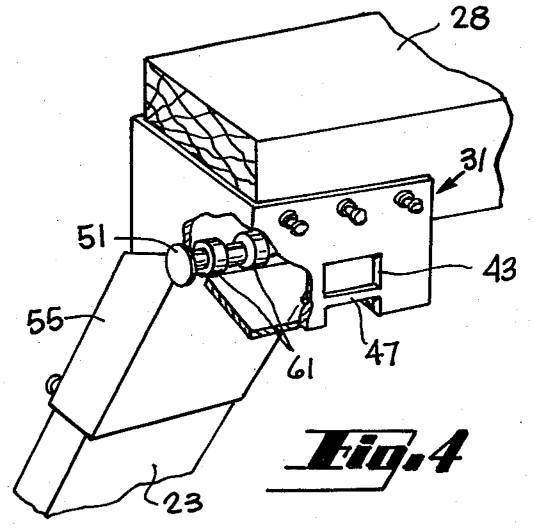
FIG. 4 is a partial cut-away view of the bracket of FIG. 3.

With reference to FIG. 4, the upwardly extending hinge posts 61 of the leg member 55 are seen to be retaining the hinge pin 51. FIG. 4 also shows that the recess 43 includes a catch 47, which is a horizontally extending bar or lip. A latch slides over catch 47 and locks onto it. However, a latch may be resiliently pried back from the catch so that a leg member may be disassembled from the central bracket member 31.

Figure 5:
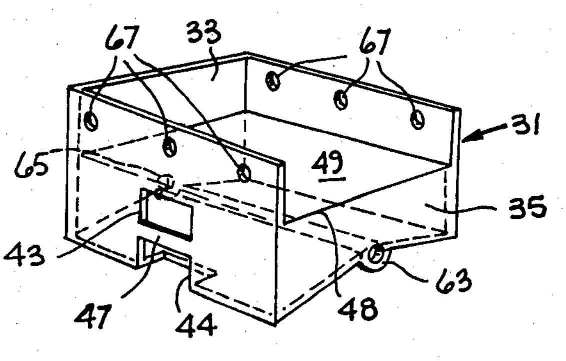
FIG. 5 is a perspective detail view of a central bracket member of the present invention.

The central bracket member 31 may be seen more clearly in FIG. 5. The upper bracket portion 33 is seen to have sidewalls which are contiguous with the sidewalls of the lower bracket portion 35. These sidewalls have a plurality of holes 67 for securing a beam in a nested relationship therein. The upper and lower portions are separated by a base plate 49 which is horizontally disposed immediately beneath a lip 48 which serves to allow entry of a beam into the upper region 33, between the three sidewalls. The base plate 49 is above the recess 43, which is defined in opposite sidewalls of lower portion 35. Recess 43 has the catch 47 extending thereacross and a second recess 44 immediately therebelow for accommodating a portion of a latch.

FIG. 5 also shows the construction of a hinge post 63 defined in one of the sdiewalls of the central bracket member. A similar hinge post, 65, is defined in the opposite sidewall. While the bottom of the central bracket member is shown to be solid, it could also be hollow.

Figure 6:
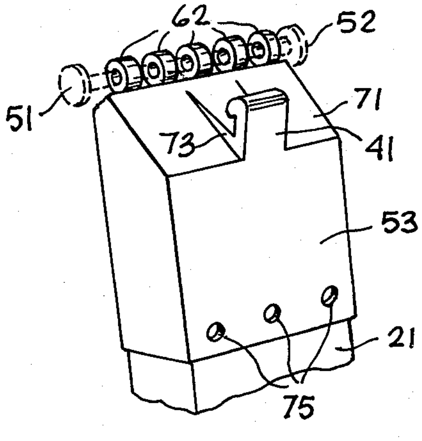
FIG. 6 is a perspective detail view of a leg member of the bracket of the present invention.

FIG. 6 shows one of the downwardly extending leg members 53 having sidewalls, as well as a top wall 71 spanning the sidewalls and closing them off at their uppermost extent. The sidewalls may support the latch 41, as well as the hinge posts 62, or the latch and hinge posts may be supported jointly by the sidewalls and the top wall 71. Greater strength is achieved in the latter construction. The hinge posts 62 of FIG. 6 are designed to be aligned and be interleaved with the hinge post 61 in FIG. 4. The latch 41 is intended to ride over catch 47 with a camming motion and may be released from the catch by a tool such as a screw driver which is inserted into the recess 43 of FIG. 5 into which the top of latch 41 projects. The top wall 71 may be seen to define a wedge shaped base 73 for latch 41 which serves to strengthen the latch. The wedge shaped base 73 slides into the second recess 44 of the central bracket 31 in FIG. 5, below catch 47. The lower portion of a central sidewall of leg member 53 has the holes 75 defined therein for allowing fasteners, such as nails, to pass through. Such fasteners attach the beam 21 to the leg member 53. Both of the opposed leg members are constructed similarly, except for the hinge posts which are offset from each other, as previously explained. The hinge posts 63 are shown to be in alignment so that the hinge pin 51 can pass therethrough. One of the ends of hinge pin 51 may be threaded so that a nut 52 can be screwed on the opposite end to keep the hinge pin in place.

Sawhorse brackets constructed in accord with the present invention may be readily disassembled by removing the hinge pin 51 and pulling hinge posts apart. Fasteners, holding beams to respective sawhorse bracket members may be removed, thereby allowing full knockdown of the bracket for ease of storage and transportation. The bracket of the present invention may be made from various metals or plastics, as long as strength is preserved. The latch and catch must each have sufficient thickness and resiliency for expected rough treatment and wear. It should be noted that all bracket members need not be made of the same material, but that materials may be mixed. For example, the central bracket member may be made of metal, while the opposed leg members may be made of plastic.

While the bracket of the present invention has been described as an aid for connecting sawhorse legs to opposite ends of the transverse beam, the bracket could also be used as an aid in supporting intermediate portions of the transverse beam when such a beam has a very long span. The only modification of the bracket which would be required is that the sidewalls of the upper portion of the central bracket member 31 would only have two opposite sides for receiving the beam, rather than three. In other words, the beam would pass through the upper portion of the central bracket member 31.

What is claimed is:

1. A sawhorse bracket comprising, a central bracket member attachable to a beam and having downwardly extending, aligned hinge posts, a pair of opposed leg members, each attachable to an end of a beam, said leg members having upwardly extending, aligned hinge posts interleaving with aligned hinge posts of the other leg member and the downwardly extending hinge posts of said central bracket member, and a removable hinge pin for passage through said hinge posts of said leg members and said central bracket member, whereby said leg members may be removably joined to said central bracket member.

2. The bracket of claim 1 wherein said central bracket member has sidewalls shaped for receiving a horizontally disposed beam.

3. The bracket of claim 1 wherein each of said opposed leg members have sidewalls shaped for receiving a downwardly extending beam forming a sawhorse leg.

4. The bracket of claim 1 wherein the angular position of said central bracket member relative to said opposed leg members is limited by a pair of latches and catches, one latch and catch on each side of said central bracket member associated with one opposed leg member.

5. A sawhorse bracket assembly comprising, a central bracket member having an upper portion with sidewalls adapted to receive and support a horizontally extending beam in a nested relation therewith, said central member having a lower portion with sidewalls connected to sidewalls of said upper portion, said lower portion including downwardly extending hinge posts aligned parallel to the direction in which a horizontal beam would be aligned in said upper portion, a pair of opposed leg members, one leg member having upwardly extending hinge posts interleaving with hinge posts of the other leg member and the downwardly extending hinge posts of said central bracket member, each of said leg members having sidewalls supporting said hinge posts, said sidewalls of each leg member having an upper and lower region extending radially outwardly relative to said hinge posts, with upper regions of opposite leg members capable of making an open stance sawhorse, and the lower regions adapted to receive and support a downwardly extending beam in a nested relation therewith, forming an angularly adjustable sawhorse leg, and a removable hinge pin for passage through said hinge posts, whereby the open stance of said sawhorse may be closed or said opposed legs removed from the central bracket.

6. The bracket of claim 5 wherein each leg member has an upwardly projecting latch and said central bracket member has two latch retaining catches, each catch disposed in an opposite sidewall for securing a latch of a respective leg member.

7. The bracket of claim 5 wherein the upper portion of said central bracket member is separated from the lower portion by a horizontally disposed base plate.

8. The bracket of claim 5 wherein said central bracket member has holes defined in the sidewalls thereof for attachment of fasteners to a transverse beam therein.

9. The bracket of claim 5 wherein said leg members have holes defined in the sidewalls thereof for attachment of fasteners to downwardly extending beams.

10. The bracket of claim 5 wherein each leg member has a top wall member spanning the sidewalls at their uppermost extent.

11. The bracket of claim 10 wherein said upper cover of each leg member has an upwardly projecting latch extending therefrom and said central member has two latch retaining catches, each catch disposed in an opposite sidewall.

* * * * *